United States Patent
Mulligan et al.

(10) Patent No.: US 9,473,624 B2
(45) Date of Patent: *Oct. 18, 2016

(54) TELEPHONE COMMUNICATION METHOD AND SYSTEM

(71) Applicant: Advanced Messaging Technologies, Inc., Los Angeles, CA (US)

(72) Inventors: Thomas Mulligan, Knocknacarra (IE); Zhanna Sudarska, Moycullen (IE); Maksym Ruchko, Doughiska (IE)

(73) Assignee: ADVANCED MESSAGING TECHNOLOGIES, INC., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/455,674

(22) Filed: Aug. 8, 2014

(65) Prior Publication Data

US 2014/0348315 A1 Nov. 27, 2014

Related U.S. Application Data

(63) Continuation of application No. 12/161,075, filed as application No. PCT/GB2007/000115 on Jan. 16, 2007, now Pat. No. 8,804,924.

(51) Int. Cl.
*H04M 3/42* (2006.01)
*G06Q 30/02* (2012.01)
(Continued)

(52) U.S. Cl.
CPC ......... *H04M 3/42008* (2013.01); *G06Q 30/02* (2013.01); *G06Q 30/0241* (2013.01); *G06Q 30/0601* (2013.01); *H04M 3/42059* (2013.01); *H04M 3/493* (2013.01)

(58) Field of Classification Search
CPC .............. H04M 11/062; H04M 11/06; H04L 29/06353
USPC .................. 379/93.01–93.37, 114.13, 265.02
See application file for complete search history.

(56) References Cited

U.S. PATENT DOCUMENTS 5,768,348 A 6/1998 Solomon et al.
5,809,114 A * 9/1998 Solomon ............... H04M 1/663
379/196

(Continued)

FOREIGN PATENT DOCUMENTS

EP 0750413 A2 12/1996
EP 1185062 A2 3/2002

OTHER PUBLICATIONS

AUD Examination Report No. 2 (dated Sep. 2, 2014), Application No. 2012203210, Date Filed—May 28, 2012, 3 pages.

(Continued)

*Primary Examiner* — Van D Huynh
(74) *Attorney, Agent, or Firm* — Blakely, Sokoloff, Taylor & Zafman LLP

(57) ABSTRACT

The invention concerns telecommunications methods and systems, and more particularly methods and systems for enabling respondents, who may be potential customers, to respond to advertisements for items (goods or services) advertised by or on behalf of advertisers. Telecommunications methods and systems of the invention provide selective communication routing or forwarding to advertisers of communications made to anonymous contact identifiers selected from a pool of anonymous contact identifiers, each anonymous contact identifier able to be allocated to an item to be advertised by or on behalf of the advertiser. The anonymous contact identifier is a public telephone number or an email address, for example. The service is provided by way of hosted system for use by a plurality of advertisers. The invention has particular application in the area of classified or personal advertising in printed or online publications, such as for real estate, automotive, travel or job advertising, for sale or auction item advertising, or for dating agency advertising.

21 Claims, 8 Drawing Sheets

(51) Int. Cl.
*G06Q 30/06* (2012.01)
*H04M 3/493* (2006.01)

(56) References Cited

U.S. PATENT DOCUMENTS

| | | | | |
|---|---|---|---|---|
| 6,839,424 | B1 * | 1/2005 | Burnett | G06Q 30/0241 379/265.02 |
| 7,424,442 | B2 * | 9/2008 | Wong | G06Q 30/02 379/112.01 |
| 2002/0016735 | A1 | 2/2002 | Runge et al. | |
| 2003/0105670 | A1 | 6/2003 | Karakawa et al. | |
| 2005/0033641 | A1 | 2/2005 | Jha et al. | |
| 2005/0041647 | A1 * | 2/2005 | Stinnie | H04M 3/42008 370/352 |
| 2005/0123118 | A1 | 6/2005 | Terry et al. | |
| 2005/0197164 | A1 | 9/2005 | Chan | |
| 2005/0251445 | A1 | 11/2005 | Wong et al. | |
| 2006/0004627 | A1 | 1/2006 | Baluja | |
| 2007/0038507 | A1 | 2/2007 | Kumar | |

OTHER PUBLICATIONS

Non-Final Office Action (dated Sep. 23, 2011), U.S. Appl. No. 12/161,075, Date Filed—Jul. 16, 2008, First Named Inventor: Thomas Mulligan, (7 pages).

EPO Communication (dated Dec. 28, 2011), European Application No. 07700386.1, Date Filed Jan. 16, 2007, (4 pages).

Non-Final Office Action (dated Jul. 18, 2012), U.S. Appl. No. 12/161,075, Date Filed—Jul. 16, 2008, First Named Inventor: Thomas Mulligan, (17 pages).

Final Office Action (dated Dec. 27, 2012), U.S. Appl. No. 12/161,075, Date Filed—Jul. 16, 2008, First Named Inventor: Thomas Mulligan, (17 pages).

Canadian Examiner's Report (dated Mar. 5, 2013), Application No. 2,642,733, Date Filed—Jan. 16, 2007, First Named Inventor: Thomas Mulligan, (3 pages).

Non-Final Office Action (dated Oct. 1, 2013), U.S. Appl. No. 12/161,075, Date Filed—Jul. 16, 2008, First Named Inventor: Thomas Mulligan, (17 pages).

AU Examination Report No. 1 (dated Dec. 2, 2013), Application No. 2012203210, Date Filed—May 28, 2012, (4 pages).

Canadian Examiner's Report (dated Dec. 23, 2013), Application No. 2,642,733, Date Filed—Jan. 16, 2007, First Named Inventor: Thomas Mulligan, (3 pages).

PCT International Search Report (dated Oct. 18, 2007), International Application No. PCT/GB2007/000115, International Filing Date Jan. 16, 2007, (15 pages).

Canadian Examination Report (Dated Apr. 20, 2016), Application No. 2,921,602. Filing Date: Jan. 16, 2007, First Named Inventor: Thomas Mulligan, 3 pages.

* cited by examiner

TELEPHONE COMMUNICATION METHOD AND SYSTEM

The present patent application is a continuation of U.S. patent application Ser. No. 12/161,075, filed Jul. 16, 2008 (which will issue as U.S. Pat. No. 8,804,924 on Aug. 12, 2014), which is a non-provisional application of International Application No. PCT/GB2007/000115, filed 16 Jan. 2007, and further claims priority to United Kingdom Application No. GB0600812.2, filed 16 Jan. 2006, and United Kingdom Application No. GB0605396.1, filed 16 Mar. 2006.

INTRODUCTION

The present invention concerns telecommunications methods and systems, and more particularly methods and systems for enabling respondents, who may be potential customers, to respond to advertisements for items (goods or services) advertised by or on behalf of advertisers.

BACKGROUND TO THE INVENTION

Call redirection is an increasingly common feature of the present day telecommunications market, and exchange switches can be set to automatically route incoming calls (e.g. customer enquiries) to designated parties if required.

SUMMARY OF THE INVENTION

In general terms, the present invention aims to provide a service for enabling response to advertisements, such as classified or display classified advertisements—in publications, and to this end there are provided telecommunications methods and systems providing selective communication routing or forwarding to advertisers of communications made to anonymous contact identifiers selected from a pool of anonymous contact identifiers, each anonymous contact identifier able to be allocated to an item to be advertised by or on behalf of the advertiser.

The anonymous contact identifier may be a publicly accessible telephone number or an email address, for example.

In accordance with one aspect of the invention, there is provided, a telecommunications method using a telecommunication system for enabling delivery of third party promotional prompts to respondents responding to advertisements for items advertised by or on behalf of advertisers, comprising the steps of:
  allocating an anonymous contact identifier (ACI) from a pool of ACI's to an item to be advertised by or on behalf of an advertiser;
  storing said ACI and associated advertiser contact details;
  storing information relating to said item to be advertised;
  forwarding said ACI for provision to respondents in association with one or more advertisements for said item;
  receiving a communication from a respondent to said ACI;
  providing a third party promotional prompt to the respondent, the prompt selected in accordance with the stored information relating to the advertised item; and
  routing or forwarding the communication to said advertiser using said associated advertiser contact details.

Preferably, the third party promotional prompt is also selected in accordance with an attribute of the respondent.

Preferably, the method includes the step of, before routing or forwarding the communication to said advertiser, providing a third party promotional prompt to the advertiser.

Preferably, the method further includes the steps of:
  storing contact details for a third party associated with the promotional prompt; and
  providing the respondent and/or the advertiser with means to selectively initiate direct communication with said third party associated with the promotional prompt.

Preferably, the ACI is an allocated telephone number, in which case the communication from a respondent to said ACI is a telephone call from a respondent caller dialing the allocated telephone number, and said promotional prompt is the playback of a recorded telephone advertisement. The ACI may also comprise a telephone number in combination with a PIN or reference number, which may be entered, after dialing, or (optionally) at the time of dialing.

Alternatively, or in addition, the ACI is an allocated email address, in which case the communication from a respondent to said ACI is an email message sent from a respondent to the allocated email address, and said promotional prompt is the provision to the respondent of an electronic advertisement.

According to another aspect of the invention, there is provided a telecommunications system for enabling delivery of third party promotional prompts to respondents responding to advertisements for items advertised by or on behalf of advertisers, the system including:
  a repository containing a pool of anonymous contact identifiers (ACI);
  a first telecommunications unit configured to:
    receive as input an advertisement identifier and related advertiser contact details;
    forward as output, in response to receipt of an advertisement identifier, an allocated ACI;
  an allocation unit to allocate an ACI from the repository to the advertisement identifier,
  a database for storing said allocated ACI in association with the advertiser contact details and information relating to said advertised item;
  a database for storing third party promotional prompts;
  a second telecommunications unit to receive communications made to the ACI and to access on the database the stored advertiser contact details and information relating to said advertised item;
  a promotional prompt serving unit to select a stored third party promotional prompt in accordance with information relating to said advertised item and to provide said promotional prompt in response to the received communication;
  a communications routing or forwarding unit to route or forward the communication in accordance with the stored advertiser details.

Preferably, the system further includes a database for storing contact details for a third party associated with the promotional prompt, said second telecommunications unit including means for using said third party contact details for providing direct connection with said third party associated with the promotional prompt.

In accordance with a further aspect of the invention, there is provided a telecommunications method using a telecommunication system for enabling respondents to respond to advertisements for items advertised by or on behalf of advertisers, comprising the steps of:
  allocating an anonymous contact identifier (ACI) from a pool of ACI's to an item to be advertised by or on behalf of an advertiser;

storing said ACI;

(optionally) associating said ACI with a status, the status able to be updated and (optionally) corresponding to whether said item is available for sale or not available for sale;

(optionally) storing said status;

forwarding said ACI for provision to respondents in association with one or more advertisements for said item;

receiving a communication from a respondent to said ACI; and managing the communication (optionally) in accordance with the stored status associated with the ACI.

Preferably, the method includes:

routing or forwarding the communication to said advertiser if the status indicates that the item associated with the ACI is available for sale; or providing a message to the respondent if the status indicates that the item associated with the ACI is not available for sale.

Preferably, the method further includes the step of, before routing or forwarding the communication to said advertiser, providing a third party promotional prompt to the respondent.

Preferably, the method further includes the step of, before routing or forwarding the communication to said advertiser, providing a third party promotional prompt to the advertiser.

Preferably, the promotional prompt is selected in accordance with, prescribed rules.

More preferably, the promotional prompt is the playback of a recorded telephone advertisement.

Preferably the method further includes the step of selectively connecting the respondent or advertiser with a third party associated with the promotional prompt.

The ACI may be an allocated telephone number, and the communication from a respondent to said ACI may be a telephone call from a respondent caller dialing the allocated telephone number. The ACI may also comprise a telephone number in combination with a PIN or reference number, which may be entered after dialing, or (optionally) at the time of dialing.

Alternatively, the ACI may be an allocated email address, and the communication from a respondent to said ACI may be an email message sent from a respondent to the allocated email address.

The step of forwarding the ACI for provision to respondents preferably comprises providing the ACI to the advertiser or to a partner party representing one or more advertisers, so enabling the advertiser or the partner party to make the ACI available to the public.

Preferably, on allocating an ACI to an item to be advertised, the method includes associating the ACI with a prescribed lifetime and, once the lifetime has expired, making the ACI available for allocating to a different item to be advertised.

In a preferred form, the status is able to be updated by or on behalf of the advertiser or a partner party representing one or more advertisers.

The ACI and the associated status are preferably stored in a database at or accessible by a system controller station, and the communication from a respondent to the ACI is received by the system controller station. The database may comprise two or more database subsets.

In a preferred form, the method includes the step of storing, on the database, a plurality of ACIs, each ACT stored in association with an item, a status, and advertiser contact details to enable the routing or forwarding of the communication to the advertiser.

Said advertiser contact details, then, may comprise one or more advertiser telephone numbers or one or more advertiser email addresses, for example, and the step of routing or forwarding the communication to said advertiser is carried out in accordance with the stored advertiser contact details, such as diverting a telephone call to an advertiser telephone number, or forwarding a received email to an advertiser email address.

The allocation of an ACI to a particular item may take the form of associating the ACI with an item identifier code.

In a preferred form, the allocation of the ACI from a pool of ACIs to an item to be advertised has a prescribed lifetime, and the prescribed lifetime is stored in said database. The prescribed lifetime may take the form of an expiry date or time.

The status corresponding to the item not being available for sale may be an indication that the item has been sold, or may be an indication that the prescribed lifetime of the allocation of the ACI to the item has expired, in which case the ACI is available for allocation to another item. Preferably, if the status associated with the ACI corresponds to the item not being available for sale, a message is returned to the respondent in accordance with whether the status represents an indication that the item has been sold or an indication that the prescribed lifetime of the allocation of the ACI to the item has expired.

Each ACI in the pool may therefore always be associated with a status, the status changing to dynamically provide a representation of whether or not it is allocated to an item, and if so allocated, whether that item is available for sale or has been sold.

In one form of the invention, the pool of ACIs is uniquely associated with a partner party, at least for a certain period, the partner party representing one or more advertisers, such that during that period the ACI can only be allocated to an item advertised by or on behalf of an advertiser represented by said partner party. Preferably, said pool is a sub-pool of a total pool of ACIs.

Preferably, the method includes enabling the partner party or the advertiser to selectively update the status of the ACI.

In addition, the method includes enabling the partner party or the advertiser to selectively update the prescribed lifetime of the allocation to the item to be advertised.

In addition or alternatively, the method includes enabling the partner party or the advertiser to provide or modify the message provided to the respondent if the status indicates that the item is not available for sale.

In a preferred form, the method comprises the steps of:

storing a list of communication line identifiers (CLIs) of respondents which are to be precluded from access to the advertiser, on receiving a communication from a respondent to the ACI, recognising the CLI of the respondent;

comparing the CLI with entries on the list of precluded CLIs;

denying routing or forwarding of the communication to the advertiser if the respondent's CLI is on the list; and allowing routing or forwarding of the communication to the advertiser if the respondent's CLI is not on the list.

In the case where the ACI is a telephone number, for example, the communication from a respondent is a telephone call, and the CLIs are telephone call line numbers. Alternatively, if the ACI is an e-mail address, the communication from a respondent is an email message, and the CLIs are originating email addresses.

In this form of the invention, the list of precluded CLIs may be associated with the pool of ACIs, or may be exclusively associated with the particular ACI allocated to the item.

Preferably, the method includes enabling a partner party or the advertiser to selectively update said list of precluded CLIs.

In this way, a partner party (such as a publisher of printed or online advertisements for individual advertisers) may selectively prevent competitors from contacting advertisers by way of the allocated ACIs. Similarly, a partner party or an advertiser may selectively, prevent a particular respondent from contacting the advertiser, e.g. if the particular respondent has been identified as known for wanton mischief or other nefarious activity.

The method may include preparing one or more reports including information selected from the group of number of ACIs allocated from the pool of ACIs, number of communications made to ACIs from the pool, length of communications made to ACIs from the pool, and revenue accrued by communications made to ACIs from the pool, and providing said one or more reports to an advertiser or to a partner party representing one or more advertisers.

In accordance with a further aspect of the invention, there is provided in a telecommunications system providing selective communication routing or forwarding to advertisers of communications made by respondents to anonymous contact identifiers (ACIs)—which may be telephone numbers or email addresses, for example selected from a pool of ACIs, each ACI able to be allocated to an item to be advertised by or on behalf of the advertiser, a method of associating a sub-pool of said pool of ACIs with a partner party representing one or more advertisers, such that the ACI can only be allocated to an item advertised by or on behalf of an advertiser represented by said partner party.

The partner party may be the advertiser himself, in which case the ACI can only be allocated to an item advertised by or on behalf of that advertiser.

Preferably, this aspect of the invention comprises providing said partner party with an interface with the telecommunications system enabling the partner party to modify a status associated with said ACI; the status serving to control whether or not a received communication made to the ACI is routed or forwarded to the advertiser of the item. The status may further serve to control whether, if a received communication is not routed or forwarded to the advertiser of the item, a message is provided to the respondent indicating that the item is no longer available or that the ACI is not allocated to an item.

Preferably, the interface enables the partner party to customise the message received by the respondent in accordance with the status associated with the ACI, if the ACI is in the sub-pool of said pool of ACIs associated with the partner party.

In accordance with another aspect of the invention, there is provided a telecommunication method using a telecommunication system providing selective call routing to advertisers of telephone calls made to telephone numbers selected from a pool of telephone numbers, each telephone number able to be allocated to an item to be advertised by or on behalf of the advertiser, the method comprising associating a sub-pool of said pool of telephone numbers with a partner party representing one or more advertisers, such that the telephone number can only be allocated to an item advertised by or on behalf of an advertiser represented by said partner party.

In accordance with yet a further aspect of the invention, there is provided a method of using a list of communication line identifiers (CLIs) of respondents which are to be precluded from access to an advertiser, for use with a telecommunications system providing selective communication routing or forwarding to advertisers of communications made to anonymous contact identifiers (ACIs) selected from a pool of ACIs, each ACI able to be allocated to an item to be advertised by or on behalf of the advertiser, the method comprising the steps of:

on receiving a communication from a respondent to the ACI, recognising the CLI of the respondent;
comparing the CLI with entries on the list of precluded CLIs;
denying routing or forwarding of the communication to the advertiser if the respondent's CLI is on the list; and
allowing routing or forwarding of the communication to the advertiser if the respondent's CLI is not on the list.

In this way, the system may be used to protect advertisers from access by competitors canvassing advertisers for business.

Preferably, the method includes the step of, in response to receiving a communication from a respondent whose CLI is on the list of precluded CLIs, providing a message to the respondent. The message may be a stored message, and may be selected from a plurality of different stored message in accordance with the CLI of the respondent.

In a preferred form, this aspect of the invention may be carried out in combination with other aspects of the invention, enabling the partner party to create a list of precluded CLIs, and to associate said list with the sub-pool of ACIs so that any communication made to ACI in said sub-pool and received from a respondent whose CLI is on the precluded list is denied routing or forwarding to the advertiser.

The method may therefore comprise the step of associating a sub-pool of said pool of ACIs with a partner party representing one or more advertisers, such that the ACI can only be allocated to an item advertised by or on behalf of an advertiser represented by said partner party.

Preferably, said partner party is provided with an interface with the communications system enabling the partner party to modify a status associated with said ACI, the status serving to control whether or not a received communication made to the ACT is normally to be routed or forwarded to the advertiser of the item.

In a preferred form, the interface enables the partner party to modify the list of precluded CLIs.

Additionally or alternatively, the status further serves to control whether, if a received communication is not routed or forwarded to the advertiser of the item, a message is provided to the respondent indicating that the item is no longer available or that the ACI used is not allocated to an item.

Additionally or alternatively, the interface enables the partner party to customise the message received by the respondent in accordance with the status associated with the ACI, if the ACI is in the sub-pool of said pool of telephone numbers associated with the partner party.

In accordance with another aspect of the invention, there is provided a telecommunications method for enabling respondents to respond to advertisements for items advertised by or on behalf of advertisers, including the steps carried out by a computer system of:

receiving an advertisement identifier and contact details for an advertiser from a user, receiving a request from the user for an allocation of an anonymous contact identifier (ACI) from a pool of available ACIs to the advertisement identifier;

providing said allocated ACI to the user, the ACI to be published along with the advertisement represented by said advertisement identifier;

receiving from the user one or more input requests for setting on said system a status associated with said allocated ACI;

receiving a communication to the ACI from a respondent responding to said advertisement; and routing or forwarding the communication in accordance with the contact details of the advertiser only if the status of the ACI at the time of receipt of the communication is set to allow such routing or forwarding.

The user and the advertiser may be the same party, or associated parties. The user may be a partner party representing a plurality of advertisers, such as an advertising house, advertisement facilitator, or publisher, the partner party responsible for publishing the advertisement represented by said advertisement identifier.

In accordance with another aspect of the invention, there is provided a telecommunications system for enabling respondents to respond to advertisements for items advertised by or on behalf of advertisers, the system comprising:

a repository containing a pool of anonymous contact identifiers (ACIs);

a first telecommunications unit configured to:
receive as input an advertisement identifier and related advertiser contact details;
(optionally) receive as input status update requests; and
forward as output, in response to receipt of an advertisement identifier, an allocated ACI;

an allocation unit to allocate an ACI from the repository to the advertising identifier;

a database for storing said allocated ACI in association with the advertiser contact details and (optionally) a status value;

(optionally) a status update unit to receive as input from the first telecommunications unit status update requests and, accordingly, to modify the stored status value in the database;

a second telecommunications unit to receive communications made to the ACI and to access on the database (optionally) the stored status value and advertiser contact details;

a communications routing or forwarding unit to route or forward the communication in accordance with the stored advertiser contact details and (optionally) the stored status value.

In one form, the ACI is a telephone number, the communication from a respondent to said ACI is a telephone call from a respondent caller dialing the allocated telephone number, and the second telecommunications unit is a telephony unit.

In an alternative form, the ACI is an email address, the communication from a respondent to said ACI is an email message sent from a respondent to the allocated email address, and the second telecommunications unit is an email receiving unit.

Preferably, the system further includes means to associate the allocated ACI with a prescribed lifetime and means for making the ACI available for allocation to a different advertisement identifier once the lifetime has expired.

In accordance with a further aspect of the invention, there is provided a telecommunications system for providing selective communication routing or forwarding to advertisers of communications made to anonymous contact identifiers (ACIs) selected from a pool of ACIs, each ACI able to be allocated to an item to be advertised by or on behalf of the advertiser, the system configured to preclude access to advertisers by a selected group of respondents identified by way of communication line identifiers (CLIs), comprising:

a CLI store containing a list of CLIs associated with selected respondents to be precluded from access to one or more advertisers;

a telecommunications unit for receiving a communication from a respondent to the ACI, including a recognition means for recognising the CLI of the respondent;

a comparison means for comparing the CLI with entries on the list of precluded CLIs;

a telecommunications routing or forwarding unit configured to:
deny routing or forwarding of the communication to the advertiser if the respondent's CLI is on the list; and
allow routing or forwarding of the communication to the advertiser if the respondent's CLI is not on the list.

In one form, the ACI is a telephone number, the communication from a respondent to said ACI is a telephone call from a respondent caller dialing the allocated telephone number, and the second telecommunications unit is a telephony unit. The ACI may also comprise a telephone number in combination with a PIN or reference number, which may be entered after dialing, or (optionally) at the time of dialing.

In an alternative form, the ACI is an email address, the communication from a respondent to said ACI is an email message sent from a respondent to the allocated email address, and the second telecommunications unit is an email receiving unit.

Preferably, the system includes an interface configured to enable the partner party to modify a status associated with said ACI, the status serving to control whether or not a received communication made to the ACI is normally to be routed or forwarded to the advertiser of the item.

In a preferred form, the system includes a stored message unit, and the status further serves to control whether, if a received communication is not routed or forwarded to the advertiser of the item, a message is provided from the stored message unit to the respondent indicating that the item is no longer available or that the ACI used is not allocated to an item.

Additionally or alternatively, the interface is further configured to enable the partner party to modify the list of precluded CLIs.

In accordance with another aspect of the invention, there is provided in a telecommunications system providing selective communication routing or forwarding to advertisers of communications made by respondents to anonymous contact identifiers (ACIs)—which may be telephone numbers or email addresses, for example—selected from a pool of ACIs, each ACI able to be allocated to an item to be advertised by or on behalf of the advertiser, a method of providing a partner party with an interface with the telecommunications system enabling the partner party to modify a status associated with said ACI, the status serving to control whether or not a received communication made to the ACI is routed or forwarded to the advertiser of the item, the method comprising sending a message via HTTP in a data content message format.

The data content message format is preferably XML.

In accordance with this or any other aspect of the invention, the message may be a status update request type selected from the group of <Allocate> and <SetSold>, wherein:

<Allocate> instructs the system to allocate for a prescribed lifetime an ACI from said pool of ACIs to an item and to associate the ACI with contact details for the advertiser of the item; and <SetSold> instructs the system to modify the status associated with the allocated ACI and to deny routing or forwarding to the advertiser, of the item of communications made to that ACT.

The message may be a rule update request type selected from the group of <Edit> and <Extend>, wherein:

<Edit> instructs the system to modify the advertiser contact details associated with the item; and <Extend> instructs the system to modify the lifetime of the allocation of the ACI to the item.

The status update request or the rule update request is preferably incorporated in one or more tags forming part of said data content message format.

The method may include enabling said partner party to forward a batch of status update requests and/or rule update requests. The batch of requests may be provided in the form of an input file forwarded to the system by way of the FTP protocol. In response to receiving and processing a batch of requests, the system may include forwarding to the partner party a batch of allocated ACIs and/or modification request confirmation messages. Such a response batch is preferably sent to the partner party as an output file in CSV (comma separated value) format and by way of the FTP protocol or as an email attachment, for example.

According to another aspect of the invention there is provided a computer-readable medium having computer-executable instructions for performing a method using a telecommunication system for enabling respondents to respond to advertisements for items advertised by or on behalf of advertisers, the method comprising the steps of:

allocating an anonymous contact identifier (ACI) from a pool of ACI's to an item to be advertised by or on behalf of an advertiser, storing said ACI;

(optionally) associating said ACI with a status, the status able to be updated and (optionally) corresponding to whether said item is available for sale or not available for sale;

(optionally) storing said status;

forwarding said ACI for provision to respondents in association with one or more advertisements for said item;

receiving a communication from a respondent to said ACI; and managing the communication (optionally) in accordance with the stored status associated with the ACI.

Preferably, the computer-readable medium includes computer-executable instructions for:

routing or forwarding the communication to said advertiser if the status indicates that the item associated with the ACI is available for sale; or providing a message to the respondent if the status indicates that the item associated with the ACI is not available for sale.

Preferably, the computer-readable medium includes computer-executable instructions for:

storing a list of communication line identifiers (CLIs) of respondents which are to be precluded from access to the advertiser, on receiving a communication from a respondent to the ACI, recognising the CLI of the respondent;

comparing the CLI with entries on the list of precluded CLIs;

denying routing or forwarding of the communication to the advertiser if the respondent's CLI is on the list; and allowing routing or forwarding of the communication to the advertiser if the respondent's CLI is not on the list.

According to another aspect of the invention, there is provided a computer-readable medium having computer-executable instructions for performing a method using a list of communication line identifiers (CLIs) of respondents which are to be precluded from access to an advertiser, for use with a telecommunications system providing selective communication routing or forwarding to advertisers of communications made to anonymous contact identifiers (ACIs) selected from a pool of ACIs, each ACI able to be allocated to an item to be advertised by or on behalf of the advertiser, the method comprising the steps of on receiving a communication from a respondent to the ACI, recognising the CLI of the respondent;

comparing the CLI with entries on the list of precluded CLIs;

denying routing or forwarding of the communication to the advertiser if the respondent's CLI is on the list; and allowing routing or forwarding of the communication to the advertiser if the respondent's CLI is not on the list.

According to a further aspect of the invention, there is provided a computer-readable medium having computer-executable instructions for performing a method using a telecommunication system for enabling delivery of third party promotional prompts to respondents responding to advertisements for items advertised by or on behalf of advertisers, comprising the steps of:

allocating an anonymous contact identifier (ACI) from a pool of ACI's to an item to be advertised by or on behalf of an advertiser;

storing said ACI and associated advertiser contact details;

storing information relating to said item to be advertised;

forwarding said ACI for provision to respondents in association with one or more advertisements for said item;

receiving a communication from a respondent to said ACI;

providing a third party promotional prompt to the respondent, the prompt selected in accordance with the stored information relating to the advertised item; and routing or forwarding the communication to said advertiser using said associated advertiser contact details.

According to yet a further aspect of the invention there is provided a telephone communication method for enabling callers to respond to advertisements for items advertised by or on behalf of advertisers, comprising the steps of:

allocating a virtual telephone number from a pool of virtual telephone numbers to an item to be advertised by or on behalf of an advertiser;

storing said virtual telephone number and an association between the virtual telephone number and telephone contact details for the advertiser, (optionally) associating said virtual telephone number with a status, the status able to be updated and (optionally) corresponding to whether said item is available for sale or not available for sale;

(optionally) storing said status;

forwarding said virtual telephone number for provision to potential callers in association with one or more advertisements for said item;

receiving a call from a caller dialing the virtual telephone number, and, (optionally) in accordance with the stored status and stored telephone contact details:

routing the call to the advertiser if the status indicates that the item associated with the virtual telephone number is available for sale, or providing a message to the caller if the status indicates that the item associated with the telephone number called is not available for sale.

Preferably, the allocation of the virtual telephone number from the pool of virtual telephone numbers to an item to be advertised has a prescribed lifetime, and the status corresponding to the item not being available for sale represents one of:

an indication that the item has been sold; and an indication that the prescribed lifetime of the allocation of the virtual telephone number to the item has expired, in which case the virtual telephone number is available for allocation to another item.

In accordance with the invention, then, the service automatically assigns an anonymous contact identifier, such as a publicly accessible telephone number (referred to herein as a virtual number) via its hosted platform to a customer, normally an advertiser, for a predetermined lifetime.

It is to be noted that an advertised item may be a good or service, or may be a group of goods or services, or a combination of goods and services. The advertiser may be an individual, e.g. a person selling an item by way of a classified advertisement in a printed publication or on a website, or offering an item by way of a hosted online auction site. Alternatively, the advertiser may be an organisation, such as a real estate agency or employment agency, which may be offering a plurality of items (properties for sale or rent, for example, or job vacancies to be filled) in a printed or online publication, in which case each item (which may be a group of items) is advertised with a separate AC.

The ACI (such as a virtual telephone number) acts as a 'front' or 'proxy' for the actual contact details (e.g. the telephone number(s)) of the advertiser, ensuring that they may be contactable but without exposing their private contact details, and thus having the potential to maintain their anonymity if required. The ACI is associated with a mapping to the status of the relevant advertisement.

The ACI may comprise one or more components that assist in retrieval of information in a database. For example, in the case of virtual telephone number, a certain digit or digits of the number may be interpreted by the system as representing a particular category of advertisements, or may direct the retrieval process to particular subset of the database on which the information is stored.

It is to be noted that, preferably, the allocation of an ACI to a particular item is temporary only, in accordance with the prescribed lifetime. This allows for re-use of ACIs from a finite pool of available ACIs, of particular relevance with regard to the use of virtual telephone numbers, where the length of the number may provide an automatic restriction on the number of available ACIs.

The skilled reader will appreciate that the invention provides a very different approach to enabling controlled anonymous telephone communication between respondents and advertisers than those hitherto contemplated. In particular, rather than providing a telephone number for an advertiser, the particular advertisement identified by way of a particular reference number, the invention includes the use of a pool of dynamically re-allocatable virtual numbers (CLIs) for use by a particular partner. The virtual numbers are automatically rotated to new advertisements based on an algorithm designed around the lifespan of the advertisements.

The invention extends to methods and/or apparatus substantially as herein described with reference to the accompanying drawings.

The invention also provides a computer program and a computer program product for carrying out any of the methods described herein and/or for embodying any of the apparatus or system features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus or system features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention, may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

With all aspects of the invention, these may be provided in any appropriate form, be it a 'method', 'apparatus', 'system', 'stored computer instruction set', etc. form. It will be appreciated that any feature of any aspect of the invention may apply to any other aspect of the invention.

This unique solution is of particular value to the advertising marketplace, and is described in more detail below.

BRIEF DESCRIPTION OF THE DRAWINGS

By way of illustration, the invention will now be described, purely by way of example, with reference to the accompanying drawings, in which.

DETAILED DESCRIPTION OF THE DRAWINGS

The service operates by allocating a virtual number against each advertiser's personal telephone number(s).

Centrally to the present invention, at any time all virtual numbers are uniquely associated with a 'stage of sale' status that determines what action the service is to initiate when the virtual number is dialed. A virtual number may be in any one of three states:

For Sale—This implies the number is live and associated with an advertisement. When called, the platform will attempt to reach the advertiser and connect the caller.

Sold—This implies that the number is live but the item associated with the advertisement is no longer available for sale. When a number assigned this state is dialed, the caller will receive playback of a prescribed voice message, and the system will not attempt to route the incoming call to the advertiser. Even though an advertisement may still be in the public domain (i.e. the advertisement may still be visible to potential customers after the product is sold), the advertiser (for example, the owner) will no longer receive calls about an item which is no longer available.

Unassigned—This implies a virtual number is not associated with an advertiser, i.e. it has either never been allocated, or its allocation has passed the end of its lifetime, and it is now available to be reassigned to a new advertisement for a predetermined lifetime.

Figure 1:
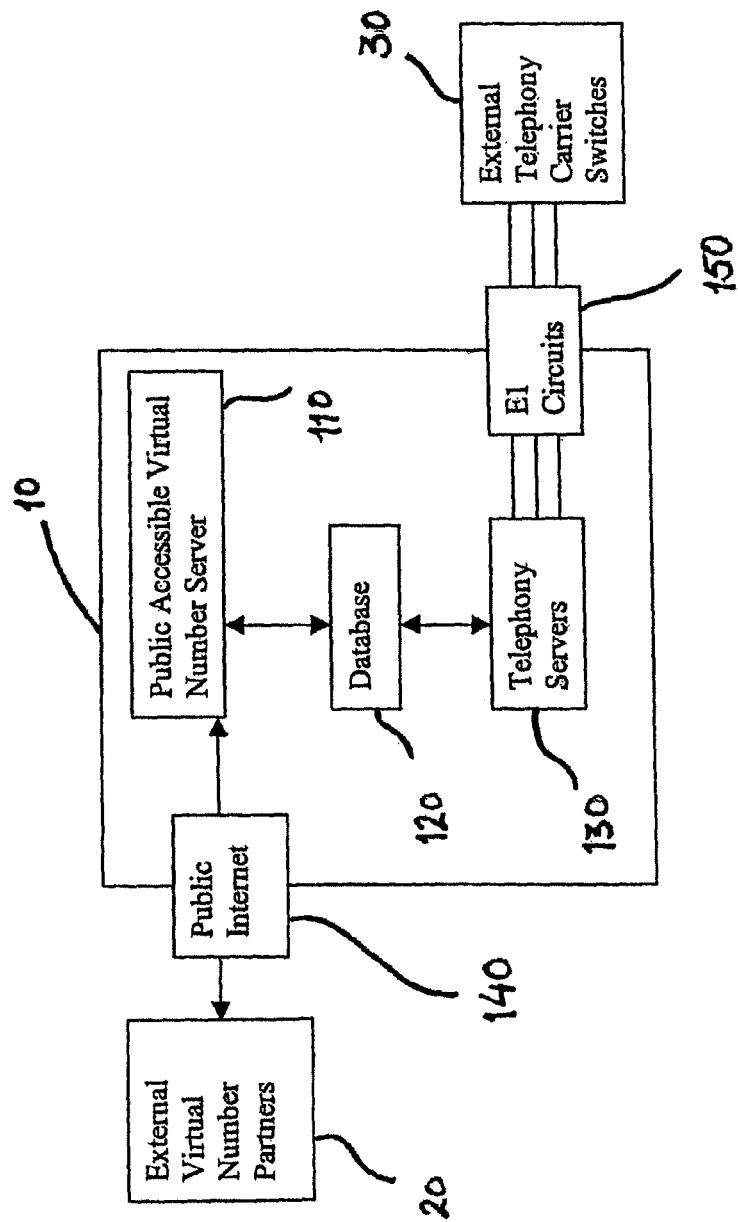
FIG. 1 diagrammatically illustrates the architecture of the system of the invention.

FIG. 1 diagrammatically illustrates the high level platform architecture developed for the invention, and the following explanation describes the virtual number status and its support in more detail.

Hosted Platform

At the core of the virtual number service is a hosted platform 10, where the software resides which allows the dynamic allocation of telephone numbers and is the interface between the advertising companies and their customers. Each advertising company can be seen as a 'partner' (reference 20) of the facilitator entity running the hosted system, or as a 'tenant' of the hosted platform 10. Since the service is hosted, the advertising companies do not require any hardware on their premises or directly under their control in order to assign virtual numbers to advertisements. The advertising companies communicate with the platform via specially designed publicly accessible interfaces.

The platform provides a reliable, fully redundant, and scalable system, and is comprised of three interconnected primary components:

Telephony Servers 130—These route callers to advertisers based on the status of the virtual number, which is accessed via the database. Calls from callers are received by way of external telephony carrier switches 30 via circuitry 150.

Database Servers 120—These comprise an oracle database and secure FTP repository, and contain all virtual number pools, status and attribute values, and actual advertiser telephone numbers.

Web Communication Servers 110—This web server farm enables communication (via the Internet 140) with the advertising company tenants 20, and also enable manipulation of virtual number attribute values.

The platform 10 and its interrelation between all of its component's algorithms, business logic and database schema has been fully designed and internally implemented and tested by the applicant.

Platform Publicly Accessible Interfaces

The platform supports three publicly accessible interfaces for communicating with advertising partners to afford allocation of virtual numbers and manipulation of their status.

1. HTTP XML Schema Interface: This interface supports partners connecting with the platform via HTTP and communicating using a uniquely defined XML schema. The schema is included in the Appendix below.

2. Web Application Interface: A web based application is published by the platform's web servers. Partners may access the interface by an internet HTTP URL connection and logging in with their administrator username and password.

3. Batch Processing Interface: A partner may supply a uniquely structured CSV text file containing thousands of advertisements that the platform parses and actions at predetermined scheduled intervals.

All three interfaces facilitate the following requests (described in further detail below with reference to FIGS. 2-7):

Allocate: Ability to request a virtual number from a preconfigured pool of numbers by supplying a unique advertiser advertisement identifier, one or more contact telephone numbers, and an advertisement expiry date. All successful requests receive a live virtual number with the status value automatically set to 'For Sale'.

Edit: Ability to modify the contact phone number(s) associated with an existing virtual number.

Extend: Ability to selectively extend the expiry date associated with a virtual number.

SetSold: Ability to change the status of a virtual number to 'Sold'.

Expiry-Date: The applicant has developed a capability which allows virtual numbers to be assigned a lifetime which is determined by how long the advertisement is to be in the public domain and is to be available to be called. This is controlled by the advertising company. When an advertisement's expiry date is reached, the status of that number will automatically revert to 'Unassigned'.

To ensure that virtual numbers are continuously recycled and made available to adverts within a finite pool of numbers, an internally designed administration application is configured to continuously monitor the expiry dates of all virtual numbers. When a virtual number has expired the application automatically changes the status of that virtual number to 'Unassigned', thus making it available for reallocation. The expiry date attribute facilitates the ability to automatically manage numbers within a finite pool.

Multi-Tenanted Service

The virtual number service of the invention is designed to be multi-tenanted, whereby each tenant is assigned their own finite pool of virtual numbers, each to be reassigned to advertisements of that tenant as their status becomes 'Unassigned'. This allows a relatively small number of virtual numbers to be constantly recycled, which improves efficiency of cost and utilisation. Each tenant, may set up or arrange for personalised caller greetings that enable the playback of marketing messages to callers to virtual numbers in their pool.

The platform 10 allocates each tenant their own unique virtual number proxy service environment which contains the following information:

Affiliate Tenant Identifier
Finite Pool of numbers
Administration account and password
Customisable welcome greeting prompt
Customisable 'advertiser not reachable' prompt
Customisable 'advertisement Sold' prompt All environments are stored in the database and accessed by the communication and telephony servers when virtual numbers are requested or dialed. Furthermore, a pool of virtual numbers may be comprised of any publicly accessible telephone numbers.

Caller Line Identification (CLI) Call Barring

The applicant has developed the capability to associate a list of barred CLIs specific to a virtual number pool. By way of the CLI, this service restricts access to advertisers from call sources (via CLI) the tenant wishes to bar from accessing their customer base. When the platform receives a call from a barred originating number it will play an appropriate message and terminate the call.

The platform supports two interfaces for advertisers to manage lists of barred numbers, a web interface, and a web service application programming interface. Both support the creation, update, deletion and assignment of CLI's to a list of CLI barred numbers to one or more pools of virtual numbers.

Operational Processes

Figure 2:
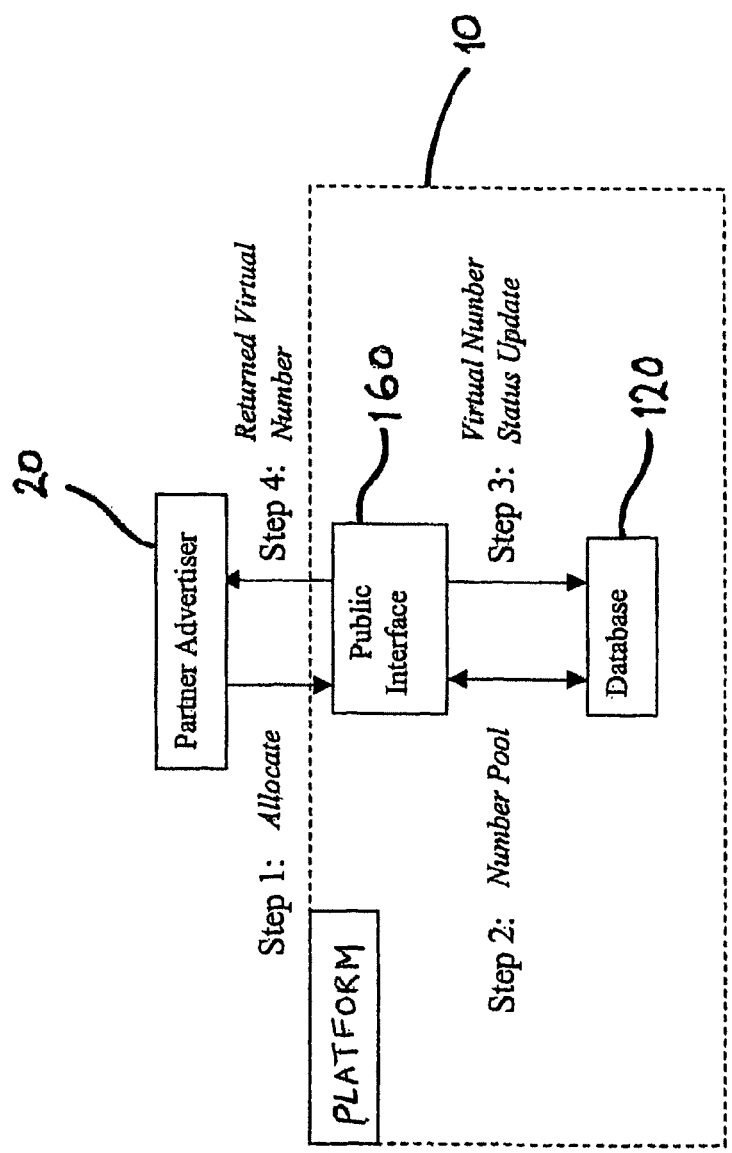
FIG. 2 schematically illustrates the process of a virtual number allocation request.

FIG. 2 schematically illustrates the process of an allocation request, enabling allocation of a virtual number to an advertisement.

Allocate (Step 1)—The advertiser 20 issues an Allocate request to the virtual number platform 10, via public interface 160 (comprising the Internet 140 and server 110) the request containing a unique advertisement identifier for the advertisement (to enable ready recognition by the advertiser), advertiser's contact telephone number(s) and selected expiry date/time.

Number Pool (Step 2)—The platform 10 selects a virtual number with a status of Unassigned from the partner's number pool stored in the database 120.

Virtual Number Status Update (Step 3)—The status of the selected virtual number in the database 120 is modified to 'For Sale' and is associated in the database with the advertiser's contact telephone number(s) and, expiry date/time.

Return to partner (Step 4)—The virtual number associated with the advertisement identifier is returned to the advertiser 20 and is immediately available for publication by the advertiser.

From this point onwards, all calls to the virtual number will be automatically redirected to the advertiser's contact telephone number or numbers.

Figure 3:
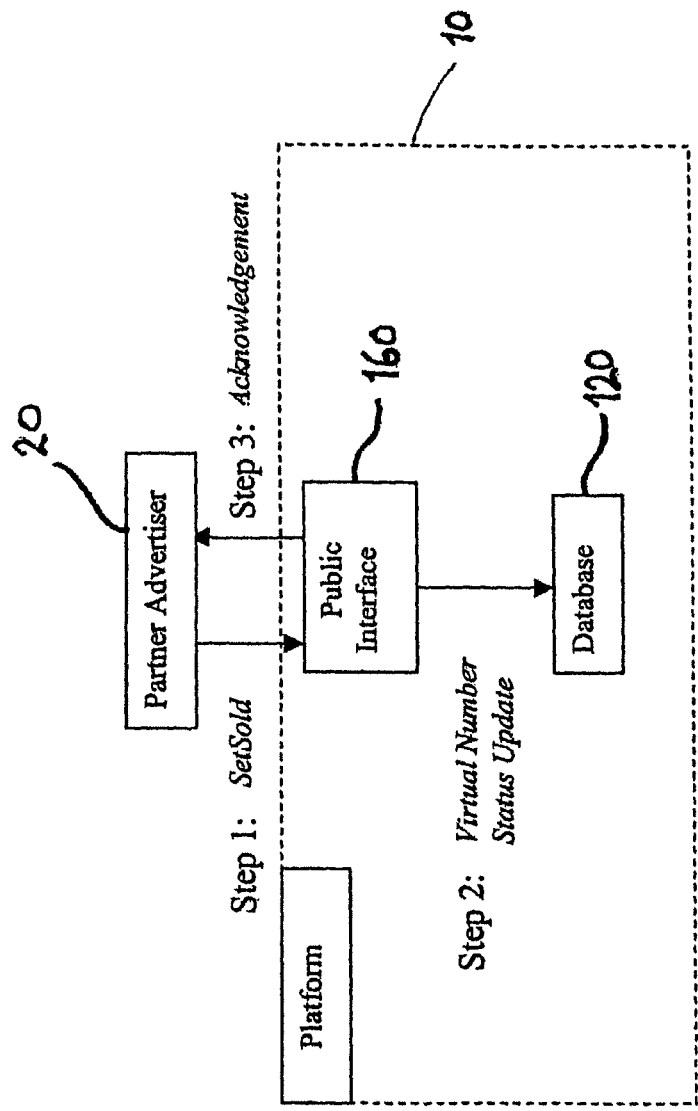
FIG. 3 schematically illustrates the process of updating the status value of a virtual number from 'ForSale' to 'Sold'.

FIG. 3 schematically illustrates the SetSold process, representing the request from the advertiser to update the status value of a virtual number, from 'ForSale' to 'Sold'.

SetSold (Step 1)—Once the item advertised has been sold, the advertiser 20 issues (via the public interface 160) a SetSold request to the platform 10, the request containing either the virtual number or the associated advertisement identifier.

Virtual Number Status Update (Step 2)—The platform 10 then modifies the status of the virtual number from ForSale to Sold within the number pool in the database 120.

Acknowledgement (Step 3)—The platform 10 responds to the partner with a return status of success to confirm the updated status.

From this point onwards, all telephone calls to the virtual number will be greeted with a customised message (as set or prescribed by the advertiser) informing the caller that the item has been sold.

Figure 4:
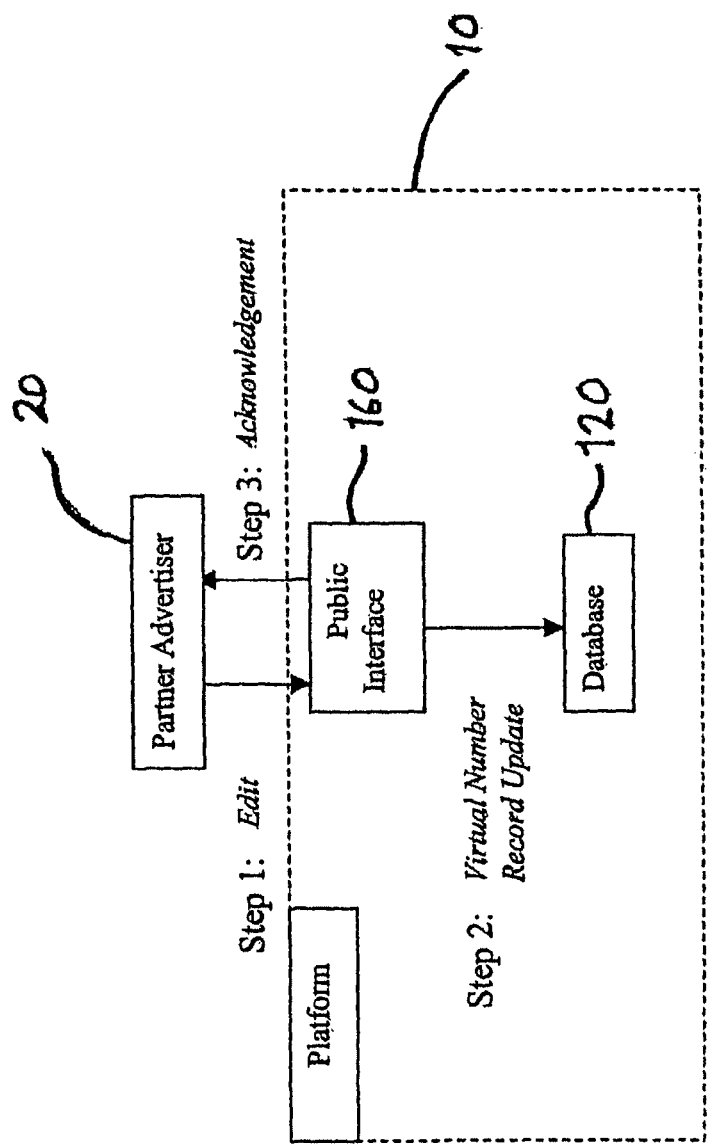
FIG. 4 schematically illustrates the process of a request to edit stored information associated with an allocated virtual number.

FIG. 4 schematically illustrates the process of an advertiser's edit request, enabling the advertiser to update the following information associated with a previously allocated virtual number:
  Contact telephone number(s)
  Email address
  Advertisement additional information Edit Request (Step 1)—The advertising partner 20 issues (via the public interface 160) an edit request to the platform 10, the request including either a virtual number or the associated advertisement unique identifier.

Virtual Number Status Update (Step 2)—The platform 10 modifies the information associated with the virtual number in the database 120.

Acknowledgement (Step 3)—The platform 10 responds to the partner 20 with a return status of success to confirm the updated status.

All subsequent telephone calls to the virtual number will be managed in accordance with the updated database information.

Figure 5:
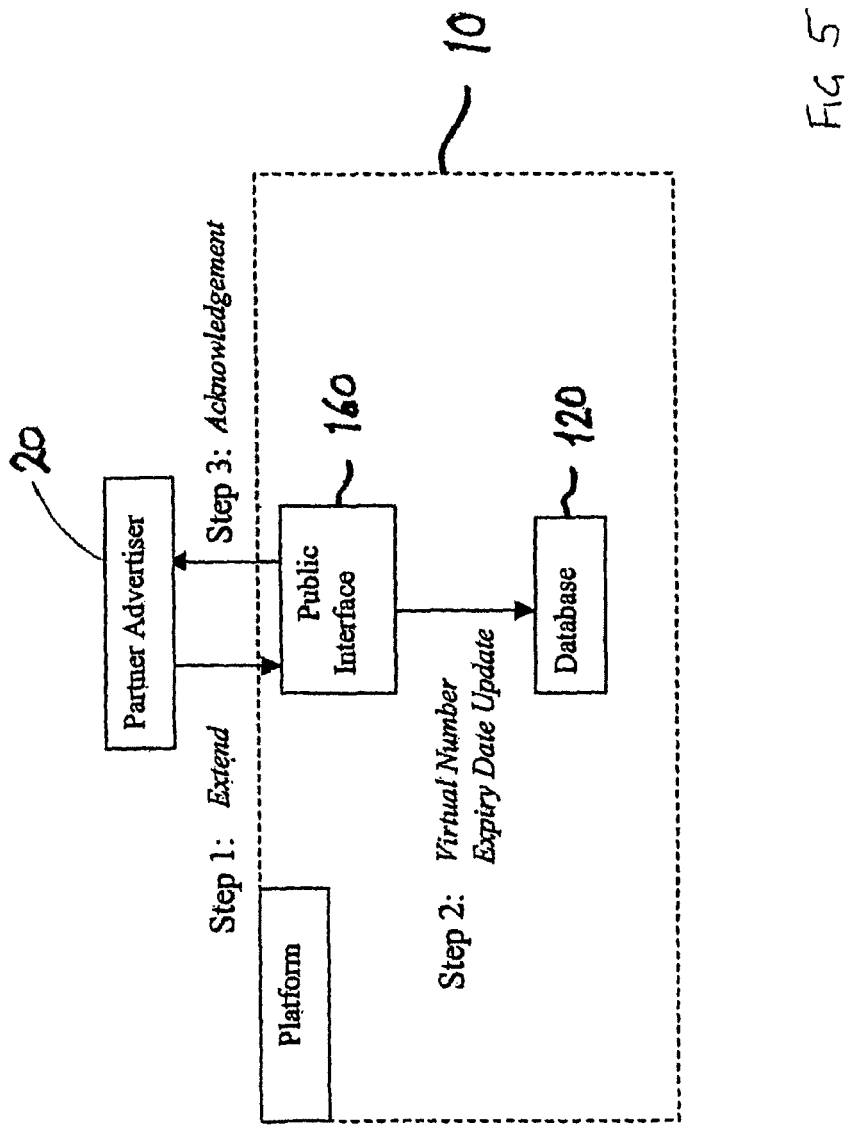
FIG. 5 schematically illustrates the process of a request to extend the allocation of a virtual number.

FIG. 5 schematically illustrates the process of an extend request, enabling a partner to update the expiry date associated with a previously allocated virtual number (e.g. to correspond to an extended period for which the relevant item is advertised).

Extend Request (Step 1)—The advertising partner 20 issues (via the public interface 160) an extend request to the platform 10, the request including either a virtual number or the associated advertisement unique identifier.

Virtual Number Status Update (Step 2)—The platform 10 modifies the information associated with the virtual number in the database 120.

Acknowledgement (Step 3)—The platform 10 responds to the partner 20 with a return status of success to confirm the updated status.

All subsequent telephone calls to the modified virtual number will be managed in accordance with the updated expiry date stored within database 120.

Figure 6:
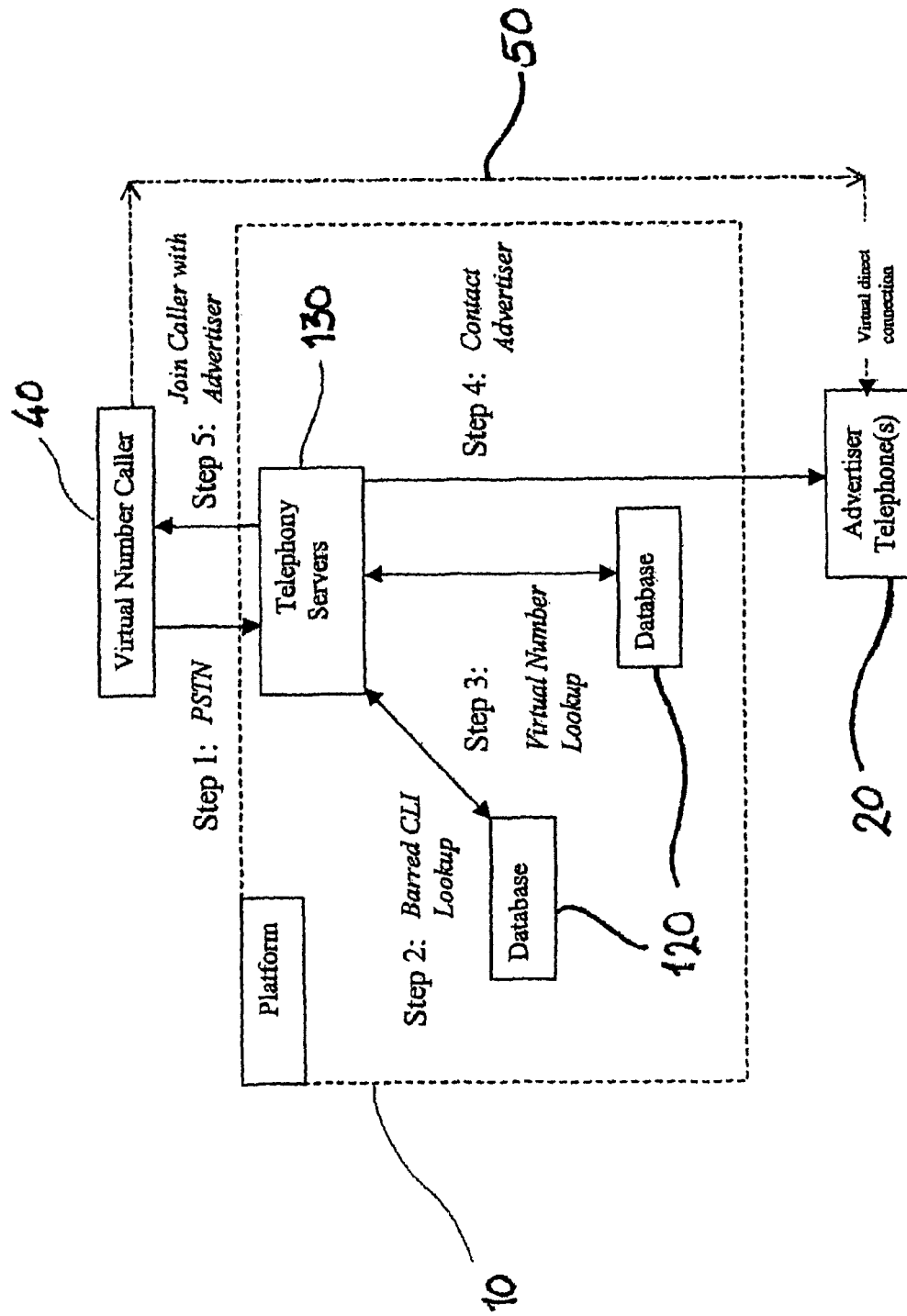
FIG. 6 schematically illustrates the virtual number call process.
Figure 7:
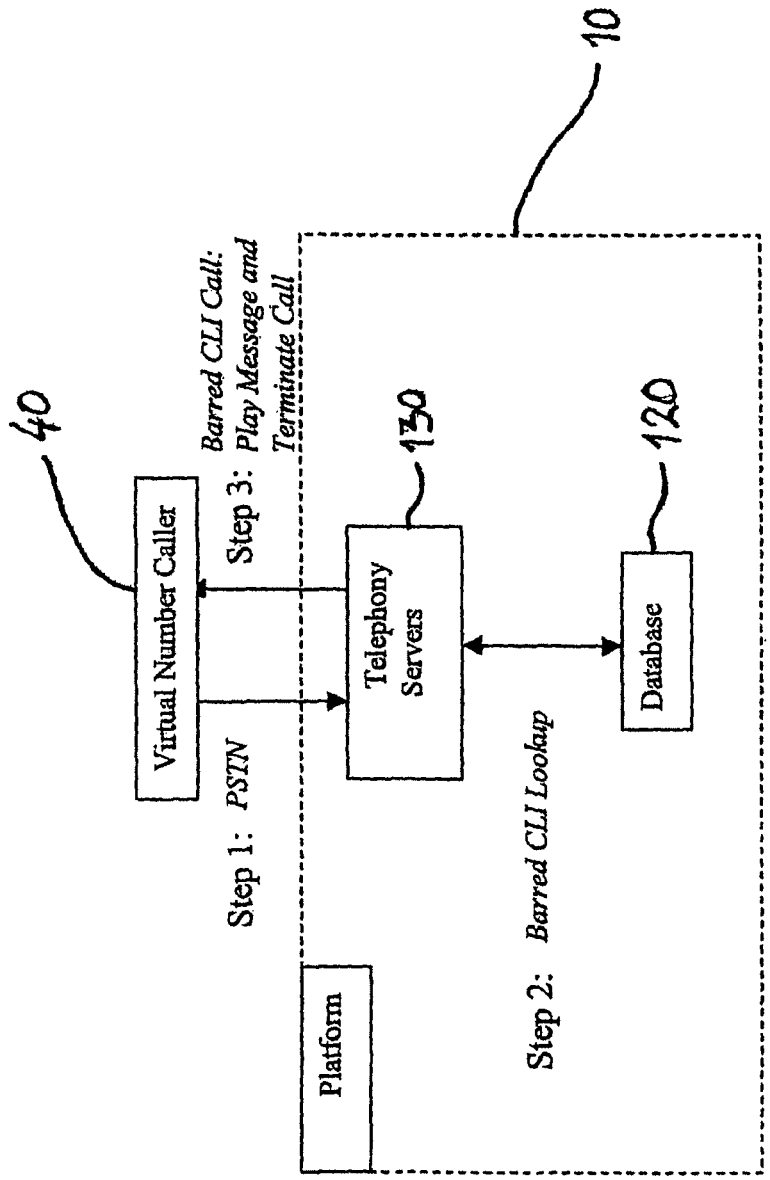
FIG. 7 schematically illustrates the processing of a call made by a barred CLI caller to a virtual number.

The following describes the virtual number call process, and the internal call processing steps that, the platform 10 performs when a virtual number is called by a caller responding to an advertisement. FIG. 6 illustrates the process when a caller is not barred from using a particular virtual number, whilst FIG. 7 illustrates the process when a caller is barred from using that number.

FIG. 6 schematically illustrates the virtual number call process, representing the internal call processing steps that the platform 10 performs when a virtual number is called.

PSTN (Step 1)—Via the public switched telephone network, a caller 40 dials a published virtual number that is terminated on platform 10, via telephony servers 130. The call may originate from a cellular, PSTN or IP network.

Barred CLI Lookup (Step 2)—The CLI of the calling party 40 is checked against the list of barred CLI numbers stored in the database 120, the list associated with the virtual number dialed. If the caller 40 is not identified as barred, the process advances to Step 3 below. If the CLI identifies that caller 40 is barred, a prescribed message is played and the call is terminated (see further description below with reference to FIG. 7).

Number Lookup (Step 3)—The platform 10 accesses properties of the number dialed in the database 120 to determine what action (based on status value) is to be taken with regard to the number called. As discussed above, the actions associated with the status values are:
  ForSale—The caller is played the stored advertiser's customised welcome greeting and asked to wait on the line while the service contacts the advertiser. See below for further detail.
  Sold—The caller is played the stored Sold greeting, and the call is terminated.
  Unassigned—The caller is played the stored number-not-in-use greeting, and the call is terminated.

Contact Advertiser (Step 4)—The platform 10 externally out dials in sequence the contact telephone number(s) associated with the virtual number. If no answer is received, the platform informs the virtual number caller of the advertiser's unavailability and suggests they call back later.

Join Caller with Advertiser (Step 5)—If the advertiser 20 answers the outdialed call, the two callers are automatically connected for two-way communication via the platform 10. To the caller 40, this appears to be a direct connection with advertiser 20, as represented in FIG. 6 at 50.

FIG. 7 schematically illustrates the call processing of a call made by a barred CLI caller to a virtual number.

PSTN (Step 1)—Via the public switched telephone network, a caller 40 dials a published virtual number that is terminated on platform 10, via telephony servers 130. The call may originate from a cellular, PSTN or IP network.

Barred CLI Lookup (Step 2)—The CLI of the calling party 40 is checked against a list of barred CLI numbers stored in the database 120, the list associated with the virtual number dialed.

Barred CLI Call (Step 3)—The caller 40 is identified as a barred caller and is played a prescribed message, customised by the partner. The call is then immediately terminated without involving contact with the advertiser.

Advertising Promotional Prompt Sub-System

Figure 8:
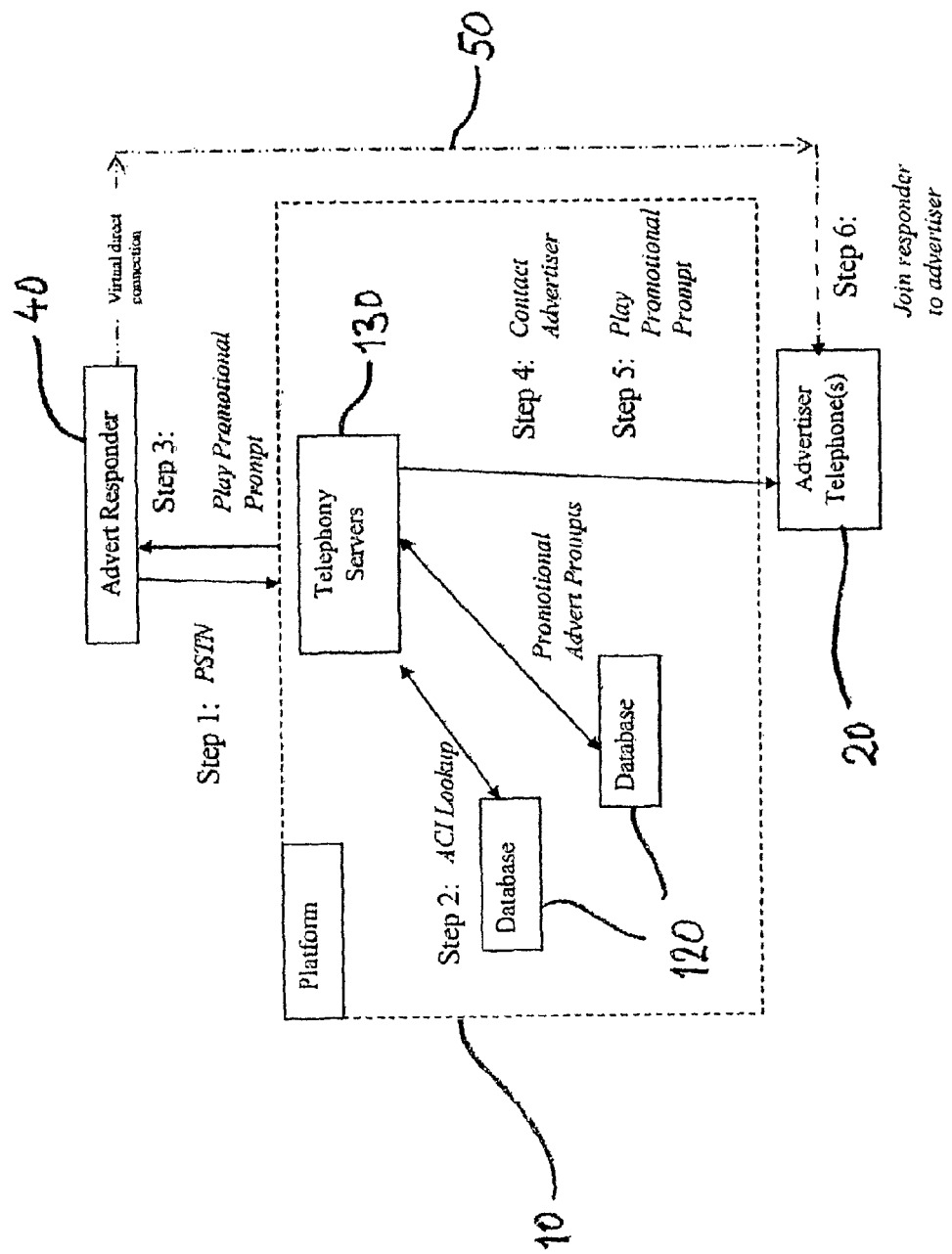
FIG. 8 schematically illustrates the process of a third party promotional prompt playback.

As illustrated schematically in FIG. 8, the system can include a further functionality to allow playing of third party promotional prompts, such as advertising 'jingles', in order to facilitate additional revenue streams for partners. This is of particular relevance in the context of classified advertisements, where both respondents (callers) and advertisers are commonly individuals, the associated partner being typically an advertisement facilitator or publisher.

A promotional prompt, may be played to either or both the respondent 40 and the advertiser 20 prior to routing the communication (ie. connecting the two parties). A wide variety of promotional prompts may be targeted at one or both parties, in accordance with a variety of factors, including:

category of item for sale, eg. auto, health, furniture, household, gardening etc.
location of advertiser
location of respondent, identified from geographical analysis of CLI
gender of advertiser (male/female)
age of advertiser
time of call In operation of a particular embodiment of this sub-system, when a respondent 40 calls the advertiser's virtual number, the platform 10 includes programming to play a promotional prompt to the respondent, in accordance with the content of the pertinent database 120. The prompt may be pre-selected in advance, or selected based on, say, the category of the advertisement or geographical location. The system then plays an additional promotional prompt to the advertiser after they have answered the call prior to connecting the parties. For example, if the advertisement is associated with a car the system may be programmed to play the jingle of a selected insurance firm, whilst the jingle of a particular holiday company is played to the advertiser.

The process steps illustrated in FIG. 8 are as follows:

PSTN (Step 1)—A caller 40 dials a published virtual number (ACI) that is terminated on platform 10 via telephony servers 130, eg. via the public switched telephone network. The call may originate from a cellular, PSTN or IP network.

Number Lookup (Step 2)—The status of the virtual number is determined via databases 120, to identify what action (based on state value) should be taken with regard to the number and what promotional categories the advert falls within.

Promotional prompt playback (Step 3)—A promotional prompt stored on platform 10 is played to the respondent, based on rules in database 120.

Contact Advertiser (Step 4)—Via telephony servers 130, platform 10 externally dials the contact telephone number associated with the virtual number called (or, if multiple numbers, the platform dials the numbers in sequence. If no answer is received, the platform informs the respondent of the advertiser's unavailability and suggests they call back later.

Promotional prompt playback (Step 5)—Platform 10 plays a promotional prompt stored on the platform to the advertiser, based on stored rules.

Connect respondent to the advertiser (Step 6)—The two parties are connected in the usual way via the platform (which appears to the parties to be a direct connection, as represented at 50).

Employing this sub-system, a classified advertising partner may create a wide variety of additional revenue models based on any combination of the following:

A flat fee for promotional prompt playback
A charge per individual prompt playback
An online auction for specific category playback, in a similar manner to the methodology used for positioning of advertising on search engine results webpages
A group rate for rotation of selected promotional prompts The sub-system is administered via a website interface which facilitates the uploading to the platform of soundfile promotional prompts and their playback definition: When a partner requests a virtual number from the platform 10 they may also identify the advertising category or categories into which the advert falls, in order to enable category-targeted prompt playback.

If the ACI is an allocated email address (as opposed to an allocated telephone number), then this aspect of the invention may be realised by providing the promotional prompt as a screen advertisement to the respondent or advertiser (such as banner advertisements) or browser 'pop-up' advertisements, the advertisement selected in accordance with respondent or advertiser information or in accordance with the nature of the item advertised.

This aspect of the present invention may further include an interactive voice response (IVR) menu (not illustrated), offering both parties the opportunity during the call to talk directly with the promotional advertiser (eg. the insurance firm whose jingle has been played). In operation, when either party selects (via DTMF entry or other) to talk with the promotional advertiser the system is programmed to directly connect that party to the promotional company associated with the prompt advertisement. This may be accomplished directly while the caller is on the call, or alternatively via a call-back after the call has terminated. For example, if a respondent is played a promotional prompt from a car insurance firm, they may at any stage instruct the platform to connect them directly to that firm to obtain an insurance quote for the car that was advertised. In a similar manner, the advertiser may elect to be connected to a holiday company after a sale has been agreed with a respondent.

This IVR feature affords partners (such as publishers of classified advertisements) a further potential additional revenue stream from their client base by offering a pay-per-response service, a charge applying to each call lead presented to the promotional prompt advertiser.

Partner Integration

It will be clear to the skilled reader that there are a variety of different partner integration solutions that may be provided with this service. Two such solutions developed by the applicant are discussed below, by way of example.

1. Dynamic Allocation of Virtual Numbers

With this service a programming API is published by the administrator of the platform, enabling partners to dynamically request individual virtual numbers over the Internet. This interface facilitates the requirement of companies to assign virtual numbers to advertisements immediately upon entry of details on their own websites.

As discussed above with reference to the accompanying process flow illustrations, the API functionality is as follows:

Assign—this assigns a virtual number to a calling partner's contact details within the platform. The virtual number and status of the operation are returned to the calling party. The virtual number is immediately live.

Edit—this allows partner's to change the contact details recorded against their previously assigned virtual numbers.

Stop—this terminates call forwarding from a particular virtual number and facilitates the playing of a partner-specific prompt to inform callers of same. The prompt played may be any message the partner wishes to convey to callers after they try to contact advertisers whose advertisements are no longer valid.

Extend—this extends the lifetime of virtual numbers associated with advertisements. Note that the partner controls the lifetime of all virtual numbers, and instigates when they should terminate and be reissued to other adverts.

All communication with the API is executed over the public Internet via the HTTP protocol. All transferred data is formatted in XML.

2. Batch Processing

With this service, the platform administrator agrees with a partner to batch process the assignment of virtual numbers to large volumes of contacts at agreed predetermined times. Both parties define the structure of the input data to the platform, as well as the output data produced by the platform, including the virtual numbers assigned to the partner. After the platform completes processing the input data, it is the responsibility of the partner to process the output file and to publish the appropriate virtual numbers (e.g. on their web advertisements).

The transfer protocol used for the input and output files is ftp. It is the responsibility of both the platform administrator and the partner to provide secure ftp drop-points with file integrity checks. The types of actions that may be input to the platform are as follows:

Assign—this assigns a virtual number to the contact details supplied. This also includes the numbers expiry date when the platform will cease to transfer calls.

Edit—this updates the contact details associated with an existing virtual number.

Stop—this terminates the transfer of calls from a given virtual number. The platform plays a partner-specific message when this number is called.

Extend this extends the expiry date for an existing virtual number.

Reporting

The platform can be configured to provide regular reporting to partners. For example, once a month all the partners are provided with two standard reports that contain all revenue and call history details for the previous month. The reports are:

1. Revenue Details—This summarises the total number of assigned virtual numbers, calls terminated, minutes generated, and revenue accrued by the partner over the selected period.

2. Call History—This lists all called virtual numbers, including the number of calls and minutes generated by each. This report may be customised to include additional partner-specific data that may be associated with virtual numbers upon assignment. This data may than be analysed by the partner, e.g. to determine which type of adverts or services have generated the most income.

In broad summary, the present invention provided a service for media owners running advertising (in particular, classified advertising) from any visible media, be it printed, online, or other. The fully automated service provides a dedicated pool of telephone numbers for the specific media outlet. When a customer places an advertisement within that media, that advertisement can be allocated a telephone number from the media owner's pool for the lifetime of that advertisement. When called by a respondent, the number automatically diverts to the advertiser's own telephone number(s), at no cost to the advertiser. Should the item be sold or the advert not renewed, the number is withdrawn from use for a period, before returning to the pool, ready to be re-issued to a new advertisement.

Further advantages and features of the invention include, separately or in combination:

Making this service available to each customer provides immediate enhanced service levels. Moreover, a private number for each advertisement gives privacy and security to customers providing a value-added customer service and differentiating the media owner from rivals.

The service can be set up such that a share of the net margin from calls made to the advertisements by respondents can be provided to the media owner, even for free advertisements, providing a new revenue stream for users of the system.

Call reporting provides a detailed overview of calls in response to advertisements, enabling the focusing of resources on the most profitable areas.

Call report analysis also enables up-selling and cross-selling opportunities, generating further incremental revenues.

Once it has been set up, the service is free to the media owner and the advertiser, which is likely to encourage service uptake and repeat business.

The 'Set/Sold' feature includes the provising of a recorded message to the caller if the item is no longer available, promoting exposure via a superior service level than hitherto available.

In addition, the self-service functionality of the 'Set/Sold' feature means that advertisers can immediately 'turn the advert off' and stop further unwanted calls as soon as the item is sold or withdrawn.

Each respondent to an advert can be greeted with a personalised message specific to the relevant publication in which the advertisement appeared, thus enhancing service and supporting the brand name and image.

If multiple advertiser telephone numbers are associated with a particular virtual telephone number, the system can respond to incoming calls by automatically 'hunting'—eg. from a landline to a mobile—so that the risk of advertisers missing calls is significantly reduced, thus ensuring the advertiser has an opportunity to engages all potential purchasers.

It will be clear to the skilled reader that the solution provided by the present invention has application in a wide variety of different industries. It has particular application in the area of classified advertising in printed or online publications. For example:

- Classified (or display classified) real estate, automotive or job advertisements, in printed of online publications.
- Individual classified advertisements, e.g. in 'Trading Post'-type printed or online publications for individuals offering new and used items for sale.
- Travel agent advertisements.
- Hosted online auction offers.
- Dating agency advertisements in printed or online publications. The facilitator of the dating agency can enable a subscriber to the dating service to be contactable only for the duration for which subscription fees have been paid.

The above description relates specifically to telephone communication between a caller and an advertiser. However, the skilled reader will readily understand that other modes of communication are embraced by the present invention, such as email or SMS/TXT messaging.

By way of example of an alternative communication mode, the invention may be carried out utilising email communication between a potential customer and an advertiser, wherein a 'virtual email address' from a pool of email addresses is allocated to an item to be advertised, the virtual email address being associated with a status, and being provided to potential customers in association with the advertisement(s) for the item. Incoming emails are then managed in accordance with the stored status associated with the virtual email address used, the email routed to the advertiser if the status indicated that the item is available for sale, or a return email being provided if the status indicates that the item is not available for sale.

Although preferred embodiments of the present invention are described above, many changes, modifications and substitutions may be made by one of ordinary skill in the art without departing from the spirit and scope of the invention.

Each feature disclosed in the description, the claims, and drawings may be provided independently or in any appropriate combination.

APPENDIX

XML Communication Schema

All streams of data passed between the partner and the platform are XML compliant, so any standard XML parser can be used. However, unique additional requirements exist for those streams:

- each line terminates with CR/LF (0x0d/0x0a)
- no spaces or tabs allowed
- <request> and </request>, <response> and </response> tags occupy separate lines
- data carrying tags should reside in separate line each and be opened and closed at the same line
- all data IS case sensitive
- if field is empty, tags should exist (like this: <field></field>)

All requests must start with tag <request> and close with tag </request>. Response begins with <response> and closes with </response>.

Common to all requests are the following XML fields:

- f_affiliateID—affiliate ID of where the request comes from. Value is always unique to a specific partner
- f_requestType—request type, actually determine which input/output parameters should be passed and which actions should be taken.

The f_requestType field can be one of the following actions:

Allocate
SetSold
Edit
Extend

Allocate

This action will activate and assign a virtual number to a partner's advertisement. All fields are required, even if they are blank.

Additional XML input parameters are:

- f_ID—optional unique advertisement identifier that may be up to 15 characters
- f_phoneNumber1—mandatory, first phone number to call forward to
- f_phoneNumber2—optional, second phone number to call forward to
- f_expireDate—DDMMYYYY format. Optional. Allocated virtual number will be kept in active state (redirecting calls) from allocation moment until expired date midnight. (up to DDMMYYYY 24:00:00). After expiry date it can be immediately reused.
- f_durationInDays—Numeric representing days. This field is only used when an expire date is not present. We take the present date of the request and add the value of this field to it. This in turn makes up the expire date of the number.
- f_info—optional, may contain additional descriptive information that may be useful for reports.
- f_emailAddress—optional, only applies when messaging in operation Output Parameters:

- f_status—mandatory (see status values)
- f_virtualnumber—11 digit virtual number. It is empty if error occurred.

SetSold

This action will set the state of a virtual number from 'For Sale' to 'Sold', thus cancelling redirection and activating corresponding prompt to inform subsequent callers that the advertisement is no longer available. All fields are required even if they are blank.

Input Parameter XML Fields:

- f_virtualnumber—previously allocated virtual number, mandatory

Output Parameters:

- f_status mandatory

Edit

This feature will permit the changing of advertiser telephone numbers that are associated with an existing advert. All fields are required even if they are blank.

Additional Input Parameters XML Fields:

- f_virtualnumber—previously allocated virtual number, mandatory
- f_phoneNumber1—mandatory
- f_phoneNumber2—optional, second phone number to forward calls to
- f_emailAddress—optional
- f_info—optional Output Parameters:
   f_status—mandatory Extend This feature will set a new expiry date for an existing advertisement associated with a virtual number. All fields are required even if they are blank Additional Input Parameter XML Fields:

f_virtualnumber—previously allocated virtual number, mandatory f_expireDate—Optional (mandatory if f_durationInDays is empty). DDMMYYYY format. Allocated virtual number will be kept in active state (redirecting calls) from up to new expired date midnight. (up to DDM-MYYYY 24:00:00)

f_durationInDays—Optional (mandatory if f_expireDate is empty)

Output Parameters:
   f_status—mandatory

Returned Status

All requests may return one of the following return codes:

0—success
1—reserved
2—platform server side error
3—reserved
4—phone number1 invalid
5—phone number2 invalid
6—no number in pool for Allocate operation, number expired or in SetSold state for SetSold, Edit and Extend operations
7—wrong input data, can not parse XML.
8—non existing ID for SetSold, Edit and Extend operations Maximum Parameter Lengths (in Characters)

f_ID—15 characters
f_affiliateID—8 characters
f_phoneNumber1 64 characters
f_phoneNumber2 64 characters
f_expireDate—8 (FIXED length)
f_durationInDays—2
f_status—1 (FIXED length)
f_info—16 characters
f_emailAddress—64 characters The formal description of a virtual number request sent by a partner to the platform is as follows:

```
Request =
RequestLine
*( requestHeader CRLF)
CRLF
messageBody
where:
RequestLine = Method SP RequestURI SP HTTPVersion CRLF
SP = <US-ASCII SP, space (32)>
CR = <US-ASCII CR, carriage return (13)>
LF = <US-ASCII LF, linefeed (10)>
Method = POST
RequestURI = /servlet/abc.servletvirtualnumbers
HTTPVersion = HTTP/1.1
messageHeader = fieldName ":" [ fieldValue ]
messageBody =
"<request>" CRLF
*( "<" xmlFieldName ">" [ xmlFieldValue ] "</" xmlFieldName ">" CRLF )
"</request>" CRLF
xmlFieldName =
"f_affiliateID"
"f_requestType"** |
"f_ID" |
"f_phoneNumber1" |
"f_phoneNumber2" |
"f_expireDate" |
"f_durationInDays" |
"f_info" |
"f_emailAddress" |
"f_virtualnumber"
xmlFieldValue = anySemanticData
```

**f_requestType values may be: Allocate, Edit, Extend, SetSold

The Example of the Well-Formed Request from the Client:

```
POST /servlet/abc.servletvirtualnumbers HTTP/1.1
Host: www.abc.com
Connection: close
Content-Length: 271
Content-Type: text/xml
Cache-Control: no-cache
<request>
<f_affiliateID>TenantID</f_affiliateID>
<f_requestType>Allocate</f_requestType>
<f_ID>AdvertID</f_adID>
<f_phoneNumber1>12345678</f_phoneNumber1>
<f_phoneNumber2></f_phoneNumber2>
<f_expireDate>17102005</f_expireDate>
<f_durationInDays></f_durationInDays>
<f_info>Car Sales</f_info>
<f_emailAddress></f_emailAddress>
</request>
```

The invention claimed is:

1. A telecommunications method using a telecommunication system for enabling respondents to respond to advertisements for items advertised by or on behalf of advertisers, comprising:

allocating an anonymous contact identifier (ACI) from a pool of ACI's to an item to be advertised by or on behalf of an advertiser;

storing said ACI;

storing information related to said item to be advertised;

associating said ACI with a status, the status able to be updated and corresponding to whether said item is available for sale or not available for sale;

storing said status;

forwarding said ACI for provision to respondents in association with one or more advertisements for said item;

receiving a communication from a respondent to said ACI; and making the ACI available for allocating to a different item to be advertised if the status indicates that the item associated with the ACI is not available for sale.

2. The method of claim 1, further comprising:

routing or forwarding the communication to said advertiser if the status indicates that the item associated with the ACI is available for sale; or providing a message to the respondent if the status indicates that the item associated with the ACI is not available for sale.

3. The method of claim 2, further comprising, on allocating an ACI to an item to be advertised, associating the ACI with a prescribed lifetime and, once the lifetime has expired, updating the status to indicate that the item associated with the ACI is not available for sale.

4. The method of claim 3, wherein the status corresponding to the item not being available for sale represents one of:

an indication that the item has been sold; and an indication that the prescribed lifetime of the allocation of the ACI to the item has expired.

5. The method of claim 1, further comprising, on allocating an ACI to an item to be advertised, associating the ACI with a prescribed lifetime and, once the lifetime has expired, updating the status to indicate that the item associated with the ACI is not available for sale.

6. The method of claim 1, wherein, if the status associated with the ACI corresponds to the item not being available for sale, a message is returned to the respondent in accordance with whether the status represents an indication that the item has been sold or an indication that a prescribed lifetime of the allocation of the ACI to the item has expired.

7. The method of claim 1, further comprising:

storing a list of communication line identifiers (CLIs) of respondents which are to be precluded from access to the advertiser;

on receiving a communication from a respondent to the ACI, recognizing the CLI of the respondent;

comparing the CLI with entries on the list of precluded CLIs;

denying routing or forwarding of the communication to the advertiser if the respondent's CLI is on the list; and allowing routing or forwarding of the communication to the advertiser if the respondent's CLI is not on the list.

8. The method of claim 1, further comprising:

preparing one or more reports including information selected from the group of number of ACIs allocated from the pool of ACIs, number of communications made to ACIs from the pool, length of communications made to ACIs from the pool, and revenue accrued by communications made to ACIs from the pool; and providing said one or more reports to an advertiser or to a partner party representing one or more advertisers.

9. The method of claim 1, further comprising:

providing an advertiser or a partner party with an interface to the telecommunications system enabling the advertiser or the partner party to modify the status associated with said ACI, the status serving to control whether or not a received communication made to the ACI is routed or forwarded to the advertiser of the item or to the partner party.

10. The method of claim 1, wherein the advertiser is a first advertiser, the method further comprising;

providing, in response to receiving the communication from the respondent to the ACI, a promotional prompt for a second advertiser to the respondent, wherein the prompt includes contact details for communicating with the second advertiser, the prompt having been selected in accordance with the stored information related to the advertised item.

11. The method of claim 10, further comprising:

providing the promotional prompt for the second advertiser to the respondent before routing or forwarding the communication to said first advertiser is performed.

12. A telecommunications system for enabling respondents to respond to advertisements for items advertised by or on behalf of advertisers, the system comprising:

a repository containing a pool of anonymous contact identifiers (ACIs);

a first telecommunications unit configured to:

receive as input an advertisement identifier and related advertiser contact details;

receive as input status update requests; and forward as output, in response to receipt of the advertisement identifier, an allocated ACI;

an allocation unit to allocate an ACI from the repository to the advertisement identifier;

a database for storing said allocated ACI in association with the advertiser contact details and a status value;

a status update unit to receive as input from the first telecommunications unit status update requests and, to modify the stored status value in the database;

a second telecommunications unit to receive a communication made to the ACI and to access on the database the stored status value and advertiser contact details;

a communications routing or forwarding unit to route or forward the received communication in accordance with the stored advertiser contact details and the stored status value;

wherein the status value indicates whether an item associated with the advertisement identifier is available for sale or not available for sale; and wherein if the status value indicates that the said item is not available for sale, the ACI is made available in the repository for allocating to a different item to be advertised.

13. The system of claim 12, wherein the ACI is a telephone number, the communication from a respondent to said ACI is a telephone call from a respondent caller dialing the telephone number, and the second telecommunications unit is a telephony unit.

14. The system of claim 12, wherein the ACI is an email address, the communication from a respondent to said ACI is an email message sent from a respondent to the email address, and the second telecommunications unit is an email receiving unit.

15. The system of claim 12, wherein the status value corresponding to the item not being available for sale represents one of:

an indication that the item has been sold; and an indication that a prescribed lifetime of the allocation of the ACI to the item has expired.

16. The system of claim 12, wherein the communications routing or forwarding unit is configured to route or forward the communication to said advertiser if the status value indicates that the item associated with the ACI is available for sale or to provide a message to the respondent if the status value indicates that the item associated with the ACI is not available for sale.

17. The system of claim 16, wherein, if the status value indicates that the item associated with the ACI is not available for sale, the message to the respondent includes an indication that the item has been sold or an indication that a prescribed lifetime of the allocation of the ACI to the item has expired.

18. The system of claim 12, wherein the advertiser is a first advertiser, and wherein the second telecommunications unit is to select a promotional prompt for a second advertiser, that is selected in accordance with the stored information related to the advertised item, and send the prompt to the respondent in response to receiving the communication made to the ACI, and wherein the prompt includes contact details for communicating with the second advertiser.

19. The system of claim 18, wherein the database is configured to store contact details for the second advertiser and information associating the second advertiser with the advertised item.

20. The system of claim 12, wherein one of the received status update requests includes instructions for extending a prescribed lifetime of the ACI.

21. The system of claim 12, wherein one of the received status update requests includes instructions for editing the stored advertiser contact details that are associated with the ACI.

* * * * *